United States Patent
Sengodan (10) Patent No.: US 11,632,842 B2
(45) Date of Patent: Apr. 18, 2023

(54) SELECTIVE INRUSH CURRENT CONTROL WITH ACTIVE CURRENT CLAMP AND MONITORING

(71) Applicant: Goodrich Corporation, Charlotte, NC (US)

(72) Inventor: Rajkumar Sengodan, Tamilnadu (IN)

(73) Assignee: GOODRICH CORPORATION, Charlotte, NC (US)

( * ) Notice: Subject to any disclaimer, the term of this patent is extended or adjusted under 35 U.S.C. 154(b) by 94 days.

(21) Appl. No.: 16/874,758

(22) Filed: May 15, 2020

(65) Prior Publication Data
US 2020/0367338 A1   Nov. 19, 2020

(30) Foreign Application Priority Data

May 15, 2019   (IN) .............................. 201911019415

(51) Int. Cl.
| | |
|---|---|
| H05B 45/50 | (2022.01) |
| H05B 45/345 | (2020.01) |
| H02H 1/00 | (2006.01) |
| H02H 9/02 | (2006.01) |

(52) U.S. Cl.
CPC .......... *H05B 45/50* (2020.01); *H02H 1/0007* (2013.01); *H02H 9/02* (2013.01); *H05B 45/345* (2020.01)

(58) Field of Classification Search
CPC ..... H05B 45/50; H05B 45/345; H02H 1/0007
See application file for complete search history.

(56) References Cited

U.S. PATENT DOCUMENTS

| | | | |
|---|---|---|---|
| 7,606,679 B1 | 10/2009 | Voicu et al. | |
| 7,741,788 B2 | 6/2010 | Ito et al. | |
| 7,994,725 B2 | 8/2011 | Bouchard | |
| 9,814,115 B2 | 11/2017 | Kido et al. | |
| 10,225,904 B2 | 3/2019 | Murray et al. | |

(Continued)

FOREIGN PATENT DOCUMENTS

| | | |
|---|---|---|
| DE | 102015013309 A1 | 5/2016 |
| EP | 2600695 A1 | 6/2013 |
| EP | 2739119 A1 | 6/2014 |

OTHER PUBLICATIONS

European Search Report; European Application No. 20173253.4; Application Filed: May 6, 2020; Search Report dated Sep. 29, 2020; 9 pages.

(Continued)

*Primary Examiner* — Anh Q Tran
*Assistant Examiner* — Jianzi Chen
(74) *Attorney, Agent, or Firm* — Cantor Colburn LLP (57) ABSTRACT

Systems and methods for providing current for a plurality of circuits are provided. Aspects include receiving, by a controller, a fault threshold for each circuit of the plurality of circuits, operating one or more switching circuits to output a current for each circuit of the plurality of circuits, wherein the one or more switching circuits are coupled to a constant current sources, and wherein the one or more switching circuits drive a plurality of current drive circuits, monitoring, by a fault determining circuit, a voltage across each circuit of the plurality of circuits, and determine a fault condition for a first circuit in the plurality of circuits based at least in part on the voltage across the first circuit exceeding the fault threshold for the first circuit.

20 Claims, 3 Drawing Sheets

(56) References Cited

U.S. PATENT DOCUMENTS

| | | |
|---|---|---|
| 2009/0045759 A1 | 2/2009 | Kang et al. |
| 2010/0177127 A1 | 7/2010 | Akiyama et al. |
| 2012/0038343 A1* | 2/2012 | Takagi .................... G05F 1/561 |
| | | 323/299 |
| 2012/0119898 A1 | 5/2012 | Shank et al. |
| 2013/0127367 A1* | 5/2013 | Esaki ................ H05B 45/3725 |
| | | 315/283 |
| 2016/0018446 A1* | 1/2016 | Chen .................. G01R 19/1659 |
| | | 363/56.05 |

OTHER PUBLICATIONS

European Office Action; dated Nov. 9, 2021; European Application No. 20173253.4; Application Filed: May 6, 2020; 5 pages.

* cited by examiner

SELECTIVE INRUSH CURRENT CONTROL WITH ACTIVE CURRENT CLAMP AND MONITORING

CROSS-REFERENCE TO RELATED APPLICATIONS

This application claims the benefit of Indian Patent Application number 201911019415 filed May 15, 2019, which is incorporated herein by reference in its entirety.

BACKGROUND

The present invention generally relates to light emitting diodes (LEDs), and more specifically, to system and method for selective inrush current control with active current clamp and monitoring configuration.

The inrush current on switching LEDs can cause issues with the operation of the LEDs. Inrush current is the instantaneous high input current drawn by a power supply or electrical equipment at turn-on. This arises due to the high initial currents required to charge the capacitors and inductors or transformers. The inrush current is also known as the switch—on surge, or the input surge current. Typically, the inrush current is of short duration whose amplitude is much greater than the operating or steady-state current. There is a need to control the inrush current when switching on LEDs.

SUMMARY

Embodiments of the present invention are directed to a system for providing current to a plurality of circuits. A non-limiting example of the system includes a constant current source, a plurality of current drive circuits configured to output predetermined current based on operation of one or more switching circuits, a fault determining circuit, and a controller configured to receive a fault threshold for each circuit of the plurality of circuits, operate the one or more switching circuits to output a current for each circuit of the plurality of circuits, wherein the one or more switching circuits drive the plurality of current drive circuits, monitor, by the fault determining circuit, a voltage across each circuit of the plurality of circuits, determine a fault condition for a first circuit in the plurality of circuits based at least in part on the voltage across the first circuit exceeding the fault threshold for the first circuit.

Embodiments of the present invention are directed to a method for providing current to a plurality of circuits. A non-limiting example of the method includes receiving, by a controller, a fault threshold for each circuit of the plurality of circuits, operating one or more switching circuits to output a current for each circuit of the plurality of circuits, wherein the one or more switching circuits are coupled to a constant current sources, and wherein the one or more switching circuits drive a plurality of current drive circuits, monitoring, by a fault determining circuit, a voltage across each circuit of the plurality of circuits, and determine a fault condition for a first circuit in the plurality of circuits based at least in part on the voltage across the first circuit exceeding the fault threshold for the first circuit.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, LEDs can be utilized in many power sensitive applications such as, for example, displays and low power electronic devices in aircraft lighting systems, aircraft interiors, aircraft display, landing lights, strobe lights for flashing emergency needs, automobiles, and commercial uses. However, as mentioned above, inrush current cause issues with switching LEDs operations. Inrush current of LED drivers refers to the input current of short duration that flows into an LED driver during initial start-up to charge capacitors on the input side. Typically, this short duration current whose amplitude is much greater than the operating or steady-state current. The inrush current is due to an electromagnetic compatibility (EMC) filter on the input and bulk capacitor on a boost circuit that is included in LED driver circuit technology.

In one or more embodiments, an inrush current control architecture is provided that overcomes the fault occurrences in conventional LED drive modules and isolates the faulty LED driver from the circuit. The LED current is monitored to prevent undesirable catastrophic failures that can occur due to high inrush current flow into a driver. This allows for selective inrush current control in power sensitive applications for LED drives, displays and low power electronic devices in aircraft systems, automobiles, and consumer electronics.

An embodiment of a circuit topology is described herein which yields LED drive with more efficiency than traditional techniques. The topology can be configured in multiple LED drive application where the power management and monitoring is significant. For driving a high-power or low power LEDs, utilizes constant current method to achieve consistent luminance over the operating cycle. This solves the issue of inrush current failures in one or more LED drive configuration and LED driving is uninterrupted. A detection technique arranged to identify such as under current/over current condition and take protective action to prevent system failure and safety hazards.

In mass production of LED lighting apparatuses, there includes the possibility that, at some point, LED drivers may tend to sink high inrush current that is higher than the specified value due to degradation of a capacitor over its lifetime. This, in effect, tends to damage the source if not fed back properly. Such an overcurrent would cause an electronic device failure or a safety hazard when electrical power is applied to the system. Such a situation can be problematic. Embodiments described herein include a circuit topology that eliminates the potential hazards and is efficient for various LED drive applications. This circuit topology is not limited to supplying power to an LED driver module but can be applied to any load in place to limit inrush current.

Figure 1A:
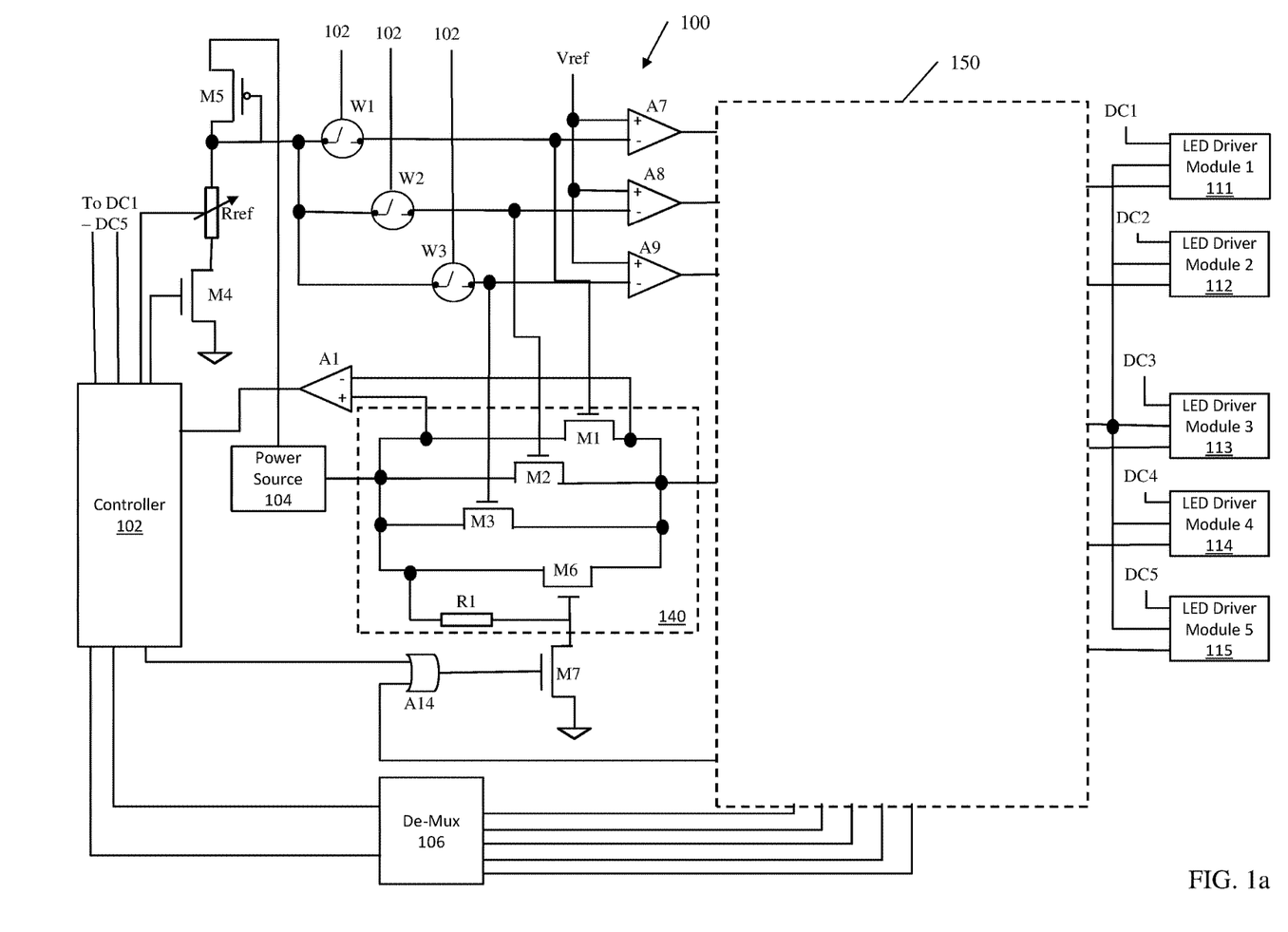
FIGS. 1a and 1b depicts a block diagram of a circuit topology for selective inrush current control with an active current clamp and monitoring configuration according to one or more embodiments.
Figure 1B:
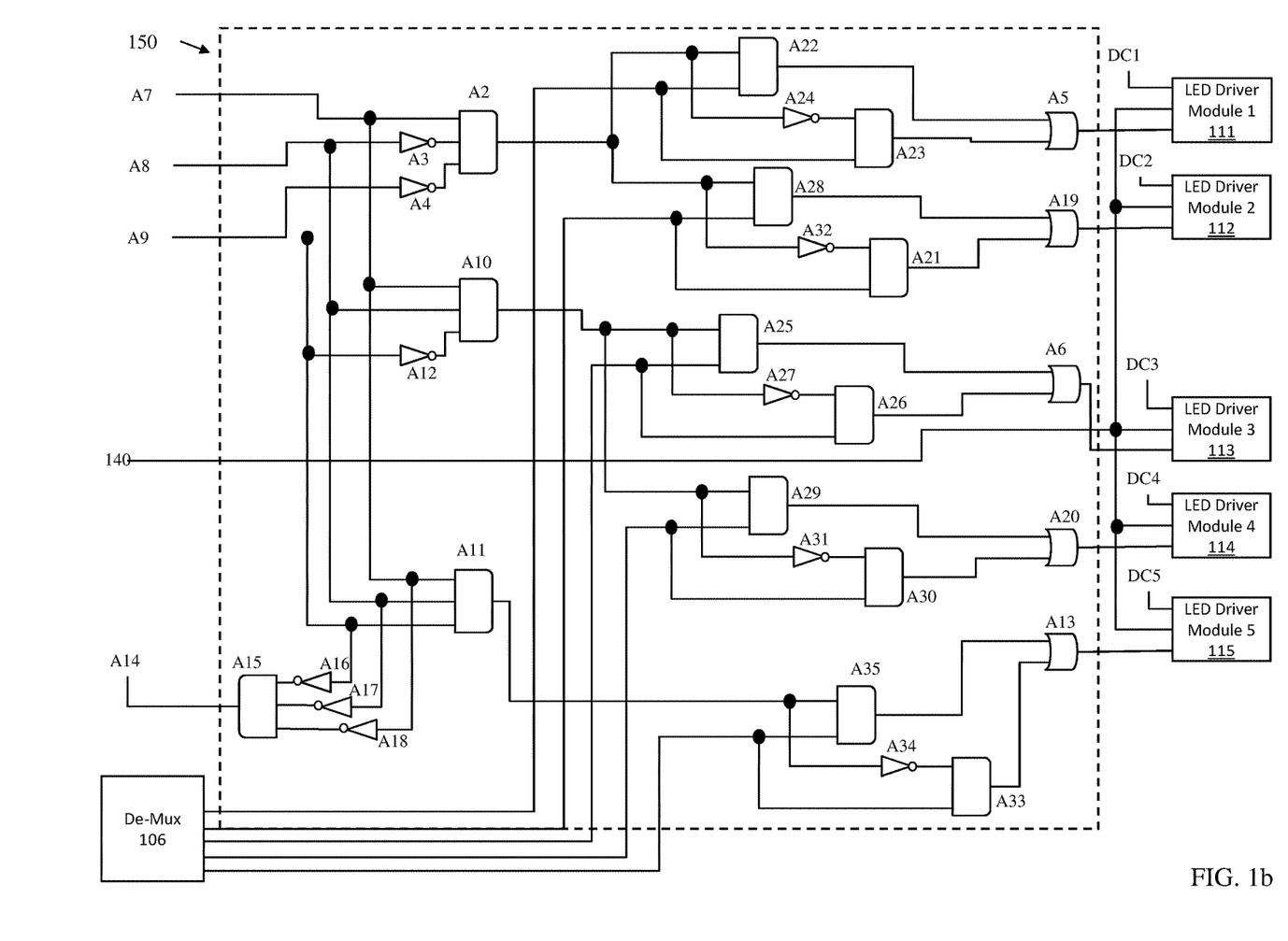

FIGS. 1a and 1b depicts a block diagram of a circuit topology for selective inrush current control with an active current clamp and monitoring configuration according to one or more embodiments. The circuit topology 100 is utilized for driving one or more LED driver modules (111, 112, 113, 114, 115) where a higher inrush current or open or short circuit to ground will be detected and the driving is interrupted. The LED driver modules (111, 112, 113, 114, 115) refer a multiple loads with different input current ratings. A fault identification and corrective mechanism is implemented to periodically measure the voltage drop across metal-oxide-semiconductor field-effect transistor (MOSFET) M6 and isolates a faulty LED driver from the circuit 100. In the event of a change in voltage drop that is greater than a predetermined threshold level caused by higher inrush current or a short circuit or an open circuit, the controller 102 can trigger a fault control mechanism and record the failure for diagnosis purposes. That is to say, the circuit topology 100 provides a fault protection, identification, and corrective mechanism for an LED driver by providing a constant current source, a failsafe control logic, a current detector, a current source selection switch, a selective current control drive, a MOSFET switch, and a plurality of LED driver modules. The voltage difference amplifier will sense the voltage level across MOSFET M6 and compare this level with a reference value stored in the microcontroller 100 (sometimes referred to as "controller") memory. The reference value is indicative of a higher inrush current, short circuit, or open circuit value. Reference to various components will be to both FIGS. 1a and 1b which are included in circuit topology 100.

In one or more embodiments, the circuit topology 100 includes a constant current source circuit that includes input from a power source 104 and includes the components of MOSFETs M4 and M5, reference resistor Rref, and a control input from the controller 102. In some embodiments, this constant current source circuit can be implemented as a current mirror circuit. The current mirror, using a PMOS M5, provides current that is driven according to the maximum current required by each of the LED driver modules (111, 112, 113, 114, 115). The current mirror is supplied by a regulated voltage source (e.g., power source 104) that, in some embodiments, includes a 0.1% tolerance precision resistor Rref to provide constant current. The constant current source circuit is controlled by controller 102 driving NMOS switch M4 which can save power during normal operation of the LED Driver Modules (111, 112, 113, 114, 115). The constant current source output current value can be varied by adjusting the resistor Rref by digitally controlled means (e.g., a variable resistor). This allows the circuit topology 100 to automatically adjust the current with respect to the load or to compensate tolerance of electronic components due to environmental disturbances and provides more accurate drive.

In one or more embodiments, the constant current circuit includes field effect transistor (PMOS) M5 and a sense resistor Rref. The constant current circuit, in the illustrated example, is a P-Channel MOSFET current mirror; however, in one or more embodiments, the constant current circuit can be an N-channel MOSFET current mirror, a bipolar transistor, or any other electronically controlled switch. In one or more embodiments, the circuit topology 100 includes a constant current NMOS switch M4 control that reduces power dissipation during LED driver steady state operation. NMOS switch M4 is utilized to provide switching action for PMOS current mirror and vice-versa. In one or more embodiments, the width/length ratio of MOSFETs (M1, M2, and M3) used with the constant current source can be increased which also increases current gain for a given gate voltage. The width/length ratio is linked to the trans-conductance and the current capability.

In one or more embodiments, the circuit topology 100 includes a fault protection, identification and corrective mechanism circuit. This fault protection, identification and corrective mechanism circuit includes a current source drive, a current source enable/disable switch, a PMOS switch, a set of comparators, and a failsafe logic circuit. The set of comparators receive signals from an input voltage and LED string voltage. Reference to these comparators are derived from the regulated voltage source Vref Whenever the input current goes above or below the operating threshold, then the LED driver module (111, 112, 113, 114, 115) will be set of an OFF state. Comparators A7, A8, A9 are connected such that the non-inverting node is connected to Vref and the inverting node is connected to the current source bias voltage.

In one or more embodiments, the output of the comparators A7, A8, A9 are fed to inputs of the circuit logic 150 (shown in greater detail in FIG. 1b). As shown in FIG. 1b, the comparators output A7, A8, and A9 are fed to a set of inverting gates (A3, A4, A12, A16, A17, A18), AND gates (A2, A10, A11), and the output of second OR gates (A5, A6, A13, A18, A19) is fed to the enable pins for respective driver modules (111, 112, 113, 114, 115). For OR gate A5, the two inputs come from the output of AND gate A22 and A23. The inputs for AND gate A22 include and output from the demux 106 and an output from A2. The inputs for AND gate A23 are an output from demux 106 and an inverted output from A2 (inversion by inverter A24). For OR gate A19, the two inputs come from the output of AND gate A28 and A21. The inputs for AND gate A28 include and output from the demux 106 and an output from A2. The inputs for AND gate A23 are an output from demux 106 and an inverted output from A2 (inversion by inverter A32). For OR gate A6, the two inputs come from the output of AND gate A25 and A26. The inputs for AND gate A25 include and output from the demux 106 and an output from A10. The inputs for AND gate A26 are an output from demux 106 and an inverted output from A10 (inversion by inverter A27). For OR gate A20, the two inputs come from the output of AND gate A29 and A30. The inputs for AND gate A29 include an output from the demux 106 and an output from A10. The inputs for AND gate A30 are an output from demux 106 and an inverted output from A10 (inversion by inverter A31). For OR gate A13, the two inputs come from the output of AND gate A35 and A33. The inputs for AND gate A35 include an output from the demux 106 and an output from A11. The inputs for AND gate A33 are an output from demux 106 and an inverted output from A11 (inversion by inverter A34). In one or more embodiments, consider A5 is OR gate which receives input signal from A22 and A23. A22 will be active during inrush current period and A23/A24 will be active during LED driver steady state operating condition. If demux 106 and A7 output is logic HIGH then A22 will output logic HIGH. If controller 102 detects a failure condition then it will disable demux 106 output. During inrush and steady state condition the particular LED driver module is disabled permanently. This is similar for each LED driver module. In one or more embodiments, LED Driver Module1 111 and LED Driver Module1 112 consume the same current as each other. Similarly, LED Driver Module3 113 and LED Driver Module4 114 consume the same current as each other but utilize a much higher current than LED Driver Module1 111 and LED Driver Module2 112. LED Driver Module5 115 consumes a higher current than any of the other driver modules.

In one or more embodiments, a voltage sense signal is monitored across MOSFET M6 to receive the difference voltage in order to detect the circuit performance. The current source enable/disable switches (W1, W2, and W3) provide bias to circuit 140 that includes MOSFETs M1, M2, and M3 and are controlled by the controller 102.

In one or more embodiments, the current source enable/disable switches (W1, W2, W3) can include inputs from more than one current source. The illustrated example provides only one current source; however, in one or more embodiments, a current source, such as current mirror circuit, can provide constant current that is controlled by the switches W1, W2, W3. The addition of more than one current source can be utilized when a versatile input current is required for the LED Driver modules (111, 112, 113, 114, 115).

In one or more embodiments, the circuit topology 100 drive is based on PMOS current source (M1, M2, and M3) to operate during power-on conditions to limit the current within the maximum inrush current and M6 switch till turn-on after a specified time for normal operation with less drain-source on resistance (RDSon) to minimize power loss. During fault occurrences, the voltage across PMOS M6 will increase above a specified value which inhibits the faulty LED driver to be open circuited. The input current for the LED driver can be of any value.

In one or more embodiments, for the working logic, the constant current source provides the required LED drive current. The current mirror is designed in such a way to provide a bias voltage for multiple PMOS current source drivers. The LED driver modules (111, 112, 113, 114, 115) can be operated sequentially or on a need basis, and in either case, the operation logic is similar. For example, consider that LED Driver Module1 111 and LED driver Module2 112 requires 60 mA (nominal current) and has a rating of 200 mA inrush current for 150 µs. Similarly, LED Driver Module3 113 and LED driver Module4 114 requires 150 mA (nominal current) and has a rating of 400 mA inrush current for 200 µs; and LED Driver Module5 115 requires 350 mA (nominal current) and has a rating of 600 mA inrush current for 300 µs. With an input voltage Vin=28V (from power source 104, power source 104 can be from a DC-DC converter or regulated aircraft 28V power), the Rref value is chosen to be 140 ohms, respectively. The Rref value can be configured to be any value and will depend on the load current, for example. Switches W1, W2, W3 will receive bias voltage for the current source drive and are controlled by controller 102 with an enable and disable function. The current source drives M1, M2, and M3 are not limited to three current drives and can be extended by any number of drives (e.g. Mn, where n is greater than 3). During operation of M1, M2, and M3, switch M6 is kept in a disabled state and can be overridden by the controller 102 through OR gate A14. This configuration is implemented to ensure less power dissipation due to constant current drive. Comparators A7, A8, A9 are configured to output logic HIGH/LOW when W1, W2, and W3 are enabled and disabled. That is to say, if W1 is enabled, then comparator A7 will output logic HIGH and the operation is similar for A8, A9 for switches W2, W3.

Consider LED Driver Module1 111 is to be enabled, for example. The controller 102 will enable switch W1 and in-turn provide bias voltage for PMOS M1. The maximum current that can be sourced by PMOS M1 is configured to be 200 mA whereas the steady state current required by LED Driver Module1 111 is 60 mA and start-up current of 200 mA for 150 µs. The PMOS M1 is enabled for 150 µs and then PMOS switch M6 is enabled during steady state operation to reduce power dissipation in M1 and Rref. When M6 is enabled, the current source section is redundant and the voltage difference amplifier A1 will sense the RDSon voltage drop across M6 switch and compare the detected current with a preset acceptable range to detect error for the respective LED driver module1 111. The fault detection process happens at two stages. During power-on, the inrush current is limited by M1, M2, M3 with respect to the current levels. Voltage sense amplifier A1 will sense the difference voltage across drain and source of the MOSFET. If the voltage drop exceeds predefined min/max value, then the microcontroller detects it as failure and disables the particular LED driver module. During steady state operation, at times failure can occur due to electronic component fatigue failures. M6 is ON and its RDSon resistance value is known from the datasheet. The amount of voltage drop occurs across M6 drain and source depends on current conducting through it. $Vds=Id*RDSon$, where Id is the drain current and Vds is the voltage drop across M6. A1 amplifier periodically checks the voltage drop across M6 and if the voltage drop exceeds predefined min/max value, then the controller 102 detects it as failure and disable the particular LED driver module. The voltage sense interval can be defined in controller 102 as per the monitoring needs. Also, during steady state operation, the voltage tolerance limit can be set to be approximately 60 mA+/−10% (LED Driver Module1) of a voltage corresponding to a normal current supplied from the power source to the driver module. The failsafe logic gate A2, A3, A4 will provide logic HIGH when W1 is enabled, W2 is disabled, and W3 is disabled. Then logic gate A5 should receive input from the controller to enable the LED Driver Module1 111. This failsafe logic is implemented in order to limit the overcurrent/undercurrent to the LED driver modules (111, 112, 113, 114, 115). Similarly, the failsafe logic gate A10, A12 will provide logic HIGH when W1 is enabled, W2 is enabled, and W3 is disabled. And the failsafe logic gate A11 will provide logic HIGH if W1, W2, and W3 are enabled. In the event of an LED short circuit or higher inrush current due to LED driver modules, the voltage across M6 will tend to increase both inrush period and steady state period. The voltage difference amplifier A1 will sense the voltage drop across M6 and compare the current with a preset acceptable range to detect errors for the respective LED driver modules and isolate from the circuit. In one or more embodiments, an error flag raised for faulty driver modules in the controller 102 will be ignored from a sequential routing table until the error is manually reset by the user. These failsafe logic gates are inputs to OR gates (A5, A6, A13, A18, A19) with associated logic components of 150 which in turn drive an enable pin for the LED driver modules.

In the event of an LED open circuit, the voltage across M6 will tend to zero volts and the voltage difference amplifier A1 will compare the current to a preset acceptable range to detect errors for the respective LED driver modules and isolate from the circuit. In one or more embodiments, an error flag raised for faulty driver modules in the controller 102 will be ignored from a sequential routing table until the error is manually reset by the user. LED Driver Module2 works similar to LED Driver Module2 as it has similar input current characteristics.

In one or more embodiments, consider LED driver module3 113 and LED driver module4 114 are to be enabled. The controller 102 will enable switch W1, W2 and in-turn provide bias voltage for PMOS M1, M2. The maximum current that can be sourced by PMOS M1, M2 is configured to be 400 mA whereas the steady state current required by LED Driver Modules 3 and 4 is 150 mA and start-up current is 400 mA for 200 μs. The PMOS M1, M2 are enabled for 2000 μs and PMOS switch M6 is enabled during steady state operation to reduce power dissipation in M1, M2, and Rref. When M6 is enabled, the current source section is redundant and the voltage difference amplifier A1 will sense the RDSon voltage drop across M6 switch and compare this to the sequentially detected current with a preset acceptable range to detect errors for the respective LED drive modules. During steady state operation, the voltage tolerance limit may be set to be approximately 150 mA+/−10% (drive module3, 4) of a voltage corresponding to a normal current supplied from the power source to the driver module.

In one or more embodiments, consider LED driver module 5 115 is to be enabled. The controller 102 will enable switch W1, W2, W3 and in-turn provide bias voltage for PMOS M1, M2, M3. The maximum current that can be sourced by PMOS M1, M2, M3 is configured to be 600 mA whereas the steady state current required by LED driver module5 is 350 mA and start-up current is 600 mA for 200 μs. The PMOS M1, M2, M3 are enabled for 300 μs and PMOS switch M6 is enabled during steady state operation to reduce power dissipation in M1, M2, M3, and Rref. When M6 is enabled, the current source section is non-operational and the voltage difference amplifier A1 will sense the RDSon voltage drop across M6 switch and compares the sequentially-detected current with a preset acceptable range to detect errors for the respective LED drive modules. During steady state operation, the voltage tolerance limit can be set to be approximately 350 mA+/−10% (drive module5) of a voltage corresponding to a normal current supplied from the power source 104 to the driver modules.

In one or more embodiments, these driver module selection routine is provide by the controller 102 to happen sequentially and in case of fault event, then that driver module will be ignored in the next sequence. The monitored fault will be logged in the controller 102 memory for prospect diagnosis purpose. The fault can be transmitted by wire or wireless medium to a remote terminal for maintenance and repair operations.

In one or more embodiments, the controller 102 provides dimming control signals DC1-DC5 to a pin in the LED Driver Modules. This pin will enable pulse width modulation (PWM) dimming and on/off control of the individual LED driver modules.

Figure 2:
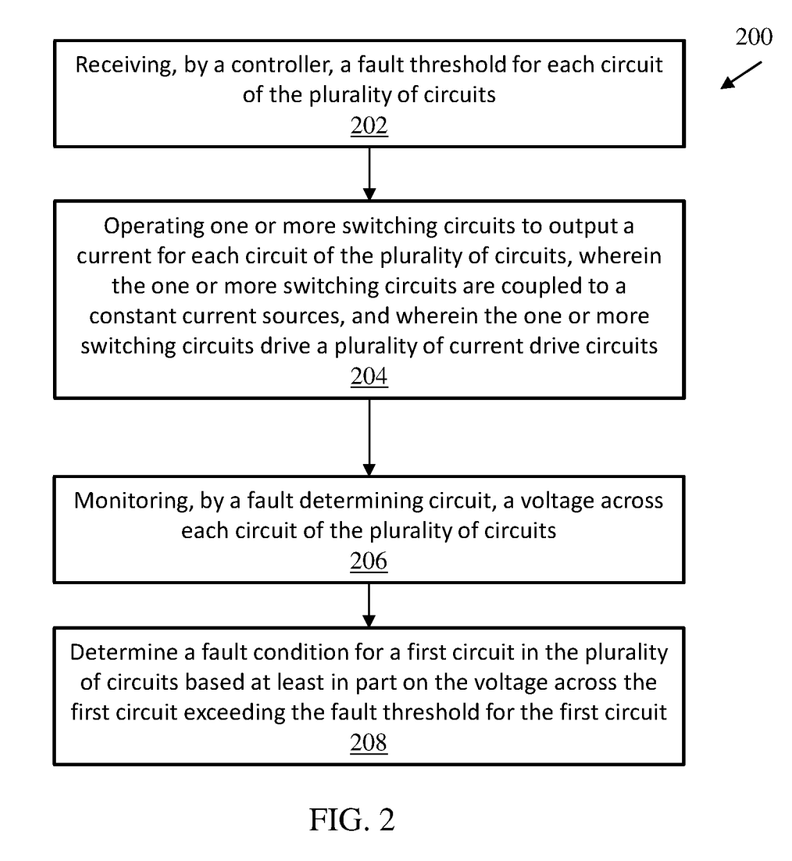
FIG. 2 depicts a flow diagram of a method for providing current to a plurality of circuits according to one or more embodiments.

FIG. 2 depicts a flow diagram of a method for providing current to a plurality of circuits according to one or more embodiments. The method 200 includes receiving, by a controller, a fault threshold for each circuit of the plurality of circuits, as shown in block 202. At block 204, the method 200 includes operating one or more switching circuits to output a current for each circuit of the plurality of circuits, wherein the one or more switching circuits are coupled to a constant current source(s), and wherein the one or more switching circuits drive a plurality of current drive circuits. The method 200, at block 206, includes monitoring, by a fault determining circuit, a voltage across each circuit of the plurality of circuits. And at block 208, the method 200 includes determine a fault condition for a first circuit in the plurality of circuits based at least in part on the voltage across the first circuit exceeding the fault threshold for the first circuit.

Additional processes may also be included. It should be understood that the processes depicted in FIG. 2 represent illustrations and that other processes may be added or existing processes may be removed, modified, or rearranged without departing from the scope and spirit of the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for providing current for a plurality of circuits, the system comprising:
   a constant current source;
   a plurality of current drive circuits configured to output predetermined current based on operation of one or more switching circuits, wherein the plurality of current drive circuits comprises a first MOSFET switch;
   a fault determining circuit, wherein the fault determining circuit comprises a first stage and a second stage, wherein the first stage comprises a comparator having a positive input and a negative input, wherein the positive input terminal is connected to a source terminal of the first MOSFET switch and the negative input terminal is connected to a drain terminal of the first MOSFET switch; and
   a controller configured to:
      receive a fault threshold for each circuit of the plurality of circuits;
      operate the one or more switching circuits to output a current for each circuit of the plurality of circuits, wherein the one or more switching circuits drive the plurality of current drive circuits;
      monitor, by the fault determining circuit, a voltage across each circuit of the plurality of circuits;
      determine a fault condition for a first circuit in the plurality of circuits based at least in part on the voltage across the first circuit exceeding the fault threshold for the first circuit.

2. The system of claim 1, wherein the controller is further configured to disable the first circuit based on the fault condition.

3. The system of claim 2, wherein the controller is further configured to:
   store the fault condition for the first circuit in a memory associated with the controller;
   receive an input to clear the fault condition and enable the first circuit;
   based on a determination that the fault condition is not present, enable the first circuit.

4. The system of claim 3, wherein the controller is further configured to:
   based on a determination that the fault condition is present, transmit a maintenance request for the first circuit.

5. The system of claim 1, wherein the constant current source comprises a PMOS current mirror.

6. The system of claim 1, wherein the constant current source comprises a NMOS current mirror.

7. The system of claim 1, wherein the constant current source includes a variable resistance element.

8. The system of claim 1, further comprising:
   a failsafe logic circuit coupled to the one or more switching circuits, wherein the failsafe logic circuit is configured to provide an enable signal for each circuit in the plurality of circuits.

9. The system of claim 8, wherein the failsafe logic circuit comprises one or more comparators, wherein a non-inverting input to the one or more comparators is coupled to a reference voltage source.

10. The system of claim 1, wherein the plurality of circuits comprise light emitting diode (LED) driver circuits.

11. A method for providing current for a plurality of circuits, the method comprising:
   receiving, by a controller, a fault threshold for each circuit of the plurality of circuits;
   operating one or more switching circuits to output a current for each circuit of the plurality of circuits, wherein the one or more switching circuits are coupled to a constant current sources; and wherein the one or more switching circuits drive a plurality of current drive circuits, wherein the plurality of current drive circuits comprises a first MOSFET switch;
   monitoring, by a fault determining circuit, a voltage across each circuit of the plurality of circuits, wherein the fault determining circuit comprises a first stage and a second stage, wherein the first stage comprises a comparator having a positive input and a negative input, wherein the positive input terminal is connected to a source terminal of the first MOSFET switch and the negative input terminal is connected to a drain terminal of the first MOSFET switch; and
   determine a fault condition for a first circuit in the plurality of circuits based at least in part on the voltage across the first circuit exceeding the fault threshold for the first circuit.

12. The method of claim 11, further comprising disabling the first circuit based on the fault condition.

13. The method of claim 12, further comprising:
   storing the fault condition for the first circuit in a memory associated with the controller;
   receiving an input to clear the fault condition and enable the first circuit; and
   based on a determination that the fault condition is not present, enabling the first circuit.

14. The method of claim 13, further comprising:
   based on a determination that the fault condition is present, transmitting a maintenance request for the first circuit.

15. The method of claim 11, wherein the constant current source comprises a PMOS current mirror.

16. The method of claim 11, wherein the constant current source comprises a NMOS current mirror.

17. The method of claim 11, wherein the constant current source includes a variable resistance element.

18. The method of claim 11, wherein a failsafe logic circuit is coupled to the one or more switching circuits; and
wherein the failsafe logic circuit is configured to provide an enable signal for each circuit in the plurality of circuits.

19. The method of claim 18, wherein the failsafe logic circuit comprises one or more comparators, wherein a non-inverting input to the one or more comparators is coupled to a reference voltage source.

20. The method of claim 11, wherein the plurality of circuits comprise light emitting diode (LED) driver circuits.

* * * * *